(12) United States Patent
Masaryk et al.

(10) Patent No.: US 11,563,252 B2
(45) Date of Patent: Jan. 24, 2023

(54) FIXING ELEMENT FOR A BATTERY PACK OF A VEHICLE, AND BATTERY PACK FOR VEHICLE INCLUDING THE SAME

(71) Applicant: Samsung SDI Co., Ltd., Yongin-si (KR)

(72) Inventors: Carl-Michael Masaryk, Graz (AT); Matthias Pucher, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 288 days.

(21) Appl. No.: 16/954,746

(22) PCT Filed: Jan. 28, 2019

(86) PCT No.: PCT/KR2019/001138
§ 371 (c)(1),
(2) Date: Jun. 17, 2020

(87) PCT Pub. No.: WO2019/151726
PCT Pub. Date: Aug. 8, 2019

(65) Prior Publication Data
US 2020/0321574 A1 Oct. 8, 2020

(30) Foreign Application Priority Data

Jan. 31, 2018 (EP) .................................... 18154411
Jan. 24, 2019 (KR) ........................ 10-2019-0009396

(51) Int. Cl.
*H01M 50/20* (2021.01)
*B60L 50/64* (2019.01)
(Continued)

(52) U.S. Cl.
CPC ............. *H01M 50/20* (2021.01); *B60L 50/64* (2019.02); *B60K 1/04* (2013.01); *B60K 6/28* (2013.01);
(Continued)

(58) Field of Classification Search
None
See application file for complete search history.

(56) References Cited

U.S. PATENT DOCUMENTS

| 4,460,663 | A | 7/1984 | Stutzbach et al. |
| 2004/0117986 | A1 | 6/2004 | Eklof |

(Continued)

FOREIGN PATENT DOCUMENTS

| CN | 203826454 U | 9/2014 |
| EP | 0052597 A1 | 5/1982 |

(Continued)

OTHER PUBLICATIONS

Extended European Search Report issued in European Patent Application No. 18154411.5, dated Jun. 29, 2018, 7pp.

(Continued)

*Primary Examiner* — Alix E Eggerding
(74) *Attorney, Agent, or Firm* — Lewis Roca Rothgerber Christie LLP

(57) ABSTRACT

A battery pack for a vehicle is provided. The battery pack comprises: at least one battery module including a plurality of secondary battery cells, a metal framework for supporting the at least one battery module, the framework including a plurality of slots extending from a bottom side to an opposing mounting side of the battery pack, and an insert tightly positioned within each slot, the insert being made of a similar material as the framework and including a through-hole adapted for accommodating a fixation element.

7 Claims, 4 Drawing Sheets

(51) Int. Cl.
  *B60K 1/04* (2019.01)
  *B60K 6/28* (2007.10)
(52) U.S. Cl.
  CPC ... *B60K 2001/0438* (2013.01); *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

| | | |
|---|---|---|
| 2006/0178708 A1 | 8/2006 | Rorvick et al. |
| 2007/0236091 A1 | 10/2007 | Fukushima |
| 2009/0152034 A1 | 6/2009 | Takasaki et al. |
| 2009/0236162 A1* | 9/2009 | Takasaki ................. B60K 1/04 180/68.5 |
| 2011/0121441 A1 | 5/2011 | Halstead et al. |
| 2012/0156539 A1* | 6/2012 | Honjo ................... H01M 50/20 429/100 |
| 2017/0327200 A1 | 11/2017 | Probst et al. |
| 2017/0346140 A1* | 11/2017 | Koebler ................ H02J 7/0029 |
| 2020/0161725 A1* | 5/2020 | Kalmbach ........... H01M 50/204 |
| 2020/0321572 A1* | 10/2020 | Bengtsson ............ H01M 50/20 |

FOREIGN PATENT DOCUMENTS

| | | |
|---|---|---|
| EP | 1170455 A1 | 1/2002 |
| JP | 2012-101663 A | 5/2012 |
| JP | 2012-129074 A | 7/2012 |
| JP | 2012-181970 A | 9/2012 |
| JP | 5212085 B2 | 6/2013 |
| JP | 5360041 B2 | 12/2013 |
| JP | 2014-120346 A | 6/2014 |
| JP | 5609495 B2 | 10/2014 |
| KR | 10-0979370 B1 | 8/2010 |
| KR | 10-2012-0033181 A | 4/2012 |
| KR | 10-1209935 B1 | 12/2012 |
| WO | WO 2005-100137 A1 | 10/2005 |

OTHER PUBLICATIONS

Office action issued in European Patent Application No. 18 154 411.5, dated Jun. 28, 2019, 4pp.

Chinese Office action issued in corresponding application No. CN 201980010925.5, dated Mar. 29, 2022. 18 pages.

\* cited by examiner

【Figure 1】
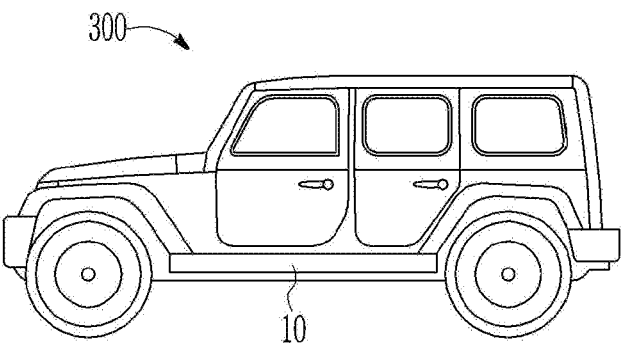
【Figure 2】
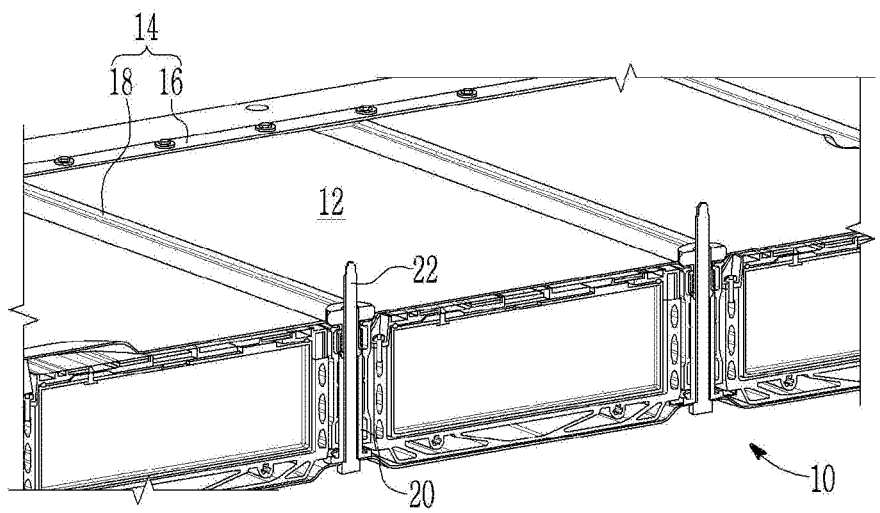

[Figure 3]
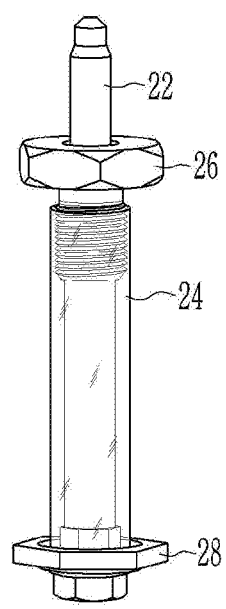

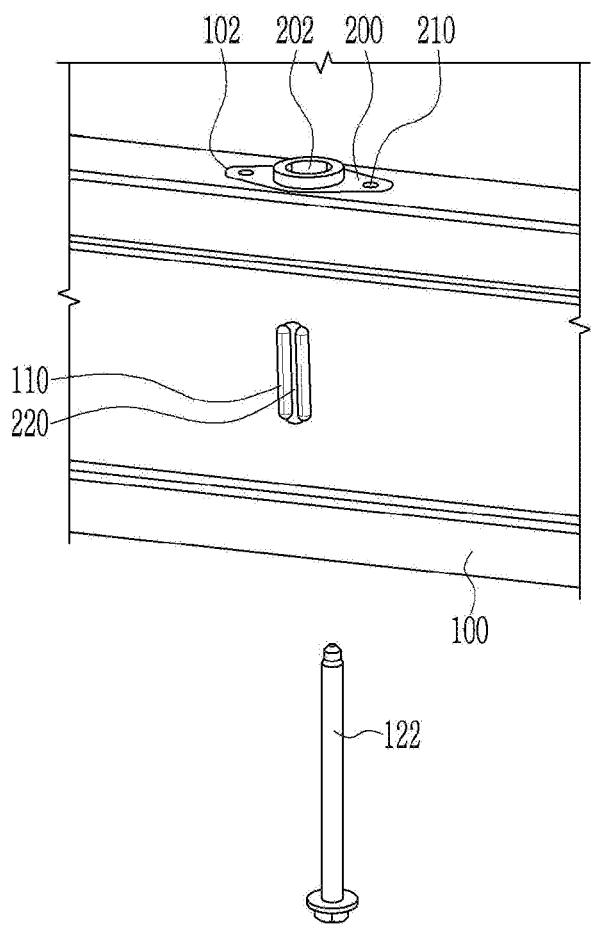
【Figure 4】

[Figure 5]
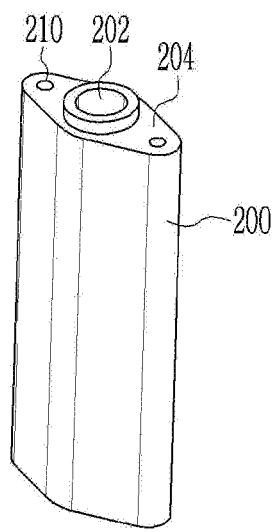

FIXING ELEMENT FOR A BATTERY PACK OF A VEHICLE, AND BATTERY PACK FOR VEHICLE INCLUDING THE SAME

CROSS-REFERENCE TO RELATED APPLICATION(S)

This application is a National Phase Patent Application of International Patent Application Number PCT/KR2019/001138, filed on Jan. 28, 2019, which claims priority of European Patent Application No. 18154411.5, filed Jan. 31, 2018 and Korean Patent Application No. 10-2019-0009396, filed Jan. 24, 2019. The entire contents of all of which are incorporated herein by reference.

TECHNICAL FIELD

The present invention relates to a battery pack for a vehicle, more specifically to a fixing element, which is useful for mounting the battery pack to a carrying structure of the vehicle.

BACKGROUND ART

In the recent years, vehicles for transportation of goods and peoples have been developed using electric power as a source for motion. Such an electric vehicle is an automobile that is propelled by an electric motor, using energy stored in rechargeable batteries. An electric vehicle may be solely powered by batteries or may be a form of hybrid vehicle powered by for example a gasoline generator. Furthermore, the vehicle may include a combination of electric motor and conventional combustion engine. In general, an electric-vehicle battery (EVB) or traction battery is a battery used to power the propulsion of battery electric vehicles (BEVs). Electric-vehicle batteries differ from starting, lighting, and ignition batteries because they are designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled in series and/or in parallel so as to provide a high energy density, in particular for motor driving of a hybrid vehicle. That is, the battery module is formed by interconnecting the electrode terminals of the plurality of unit battery cells depending on a required amount of power and in order to realize a high-power rechargeable battery.

A battery pack is a set of any number of (preferably identical) battery modules. They may be configured in a series, parallel or a mixture of both to deliver the desired voltage, capacity, or power density. Components of battery packs include the individual battery modules, and the interconnects, which provide electrical conductivity between them. A battery management system (BMS) is provided for managing the battery pack, such as by protecting the battery from operating outside its safe operating area, monitoring its state, calculating secondary data, reporting that data, controlling its environment, authenticating it and/or balancing it.

To provide thermal control of the battery pack a thermal management system is required to safely use the at least one battery module by efficiently emitting, discharging and/or dissipating heat generated from its rechargeable batteries. If the heat emission/discharge/dissipation is not sufficiently performed, temperature deviations occur between respective battery cells, such that the at least one battery module cannot generate a desired amount of power. In addition, an increase of the internal temperature can lead to abnormal reactions occurring therein and thus charging and discharging performance of the rechargeable deteriorates and the life-span of the rechargeable battery is shortened. Thus, cell cooling for effectively emitting/discharging/dissipating heat from the cells is required.

The mechanical integration of such a battery pack requires appropriate mechanical connections between the individual components, e.g. of battery modules, and between them and a supporting structure of the vehicle. These connections must remain functional and save during the average service life of the battery system. Further, installation space and interchangeability requirements must be met, especially in mobile applications.

Mechanical integration of battery modules can be achieved by providing a carrier framework and by positioning the battery modules thereon. Fixing the battery cells or submodules may be achieved by fitted depressions in the framework or by mechanical interconnectors such as bolts or screws. Alternatively, the battery modules are confined by fastening side plates to lateral sides of the carrier framework. Further, cover plates may be fixed atop and below the battery modules.

The carrier framework of the battery pack is mounted to a carrying structure of the vehicle. In case the battery pack shall be fixed at the bottom of the vehicle, the mechanical connection may be established from the bottom side by for example bolts passing through the carrier framework of the battery pack. The framework is usually made of aluminum or an aluminum alloy to lower the total weight of the construction. However, battery packs for vehicles may have a weight of 600 kg or more and thus need to be fixed at several positions with the carrying structure of the vehicle. Each of these fixings must still ensure tightness and mechanical stability of the battery pack. In the state of art, the fixation includes the use of specifically designed steel bushings which are inserted into slots of the framework and provide a through-hole for a screw. These bushings need to be coated with anti-corrosion layers so as to avoid corrosive processes with the framework. Furthermore, a sealing needs to be established on the lower side of the steel bushing as well as on the upper side where the screw is fixed by a nut. Finally, the steel bushing includes a twist protection element so as to avoid twisting of the steel bushing within the slot of the frame. As a consequence, the manufacturing process of mounting the battery pack to the carrying structure of the vehicle is complicated and automatization of the process is hindered.

DISCLOSURE

Technical Problem

It is thus an object of the present invention to overcome or reduce at least some of the drawbacks of the prior art and to provide a battery pack which could be more easily mounted to the carrying structure of the vehicle. In particular, the solution should allow automatization of the manufacturing process.

Technical Solution

One or more of the drawbacks of the prior art could be avoided or at least reduced by means of the present invention. A battery pack for a vehicle according to an embodiment of the present invention comprises: at least one battery module including a plurality of secondary battery cells, a metal framework for supporting the at least one battery module, the framework including a plurality of slots extending from a bottom side to an opposing mounting side of the battery pack, and an insert tightly positioned within each slot, the insert being made of a similar material as the framework and including a through-hole arranged for accommodating a fixation element.

In other words, the inventive battery pack includes slots being formed within a part of the supporting framework, i.e. a circumferential frame or cross-member subdividing an inner space of the frame and supporting the battery modules assembled therein. The slots extend from a bottom side of the battery pack towards the mounting side where the battery pack is fixed to the carrying structure of the vehicle. Within these slots there are provided specific inserts, which include a central through-hole through which the fixation element, in particular a screw, is passed when the battery pack is mounted to the vehicle. A mayor advantage of the inventive insert is that the insert body is made of a similar (in particular the same) material as the frame. Since the materials are similar, no separate anti-corrosive coating of the insert is needed compared to for example use of a steel bushing and aluminum frame in the state of art. Further, the insert and framework do have equal thermal expansion coefficients. Preferably, the framework and the insert are made of aluminum or an aluminum alloy.

The insert may be pressed into the slots of the framework of the battery pack in a way of a quick and simple operation that can be done automatically. Furthermore, a simple sealing due to huge sealing surface is possible. For example, a simple flat gasket can be used for both sides of the insert. Moreover, mounting the battery pack including the insert to the carrying structure of the vehicle is simplified due to the fact that only the fixing element must be passed through the through-hole of the insert and no additional elements, like bushings or counter nuts are needed.

According to another preferred embodiment of the present invention, a hole is extending from a side surface of the framework towards the slot and the insert is fixed within the slot by means of a welded joint placed within the hole. In other words, a fixing of the insert within the slot of the framework is achieved by welding. In principle, such welding may also be performed on the bottom side or mounting side of the framework, however, uneven surfaces may result which may worsen the sealing of the battery pack. Therefore, welding is performed from lateral side of the insert via a hole provided at a lateral side of the framework to end in the slot. Establishing a welding point between parts made of similar material, in particular aluminum or aluminum alloys, is more easy compared to welding of parts made of different materials. Welding may be done automatically. Finally, any additional twist protection elements need not to be established in the welded insert.

It is further preferred that the insert has a shape, which cannot be rotated when tightly positioned within the slot. Such an embodiment may have the advantage that the position of the insert during the welding is fixed against rotation. In particular, the insert may be a cylindrical body having an elliptic base since the manufacturing process is simple, the sealing face is not interrupted by edges, and the upper and lower surfaces of the insert may be easily used for carrying additional functional elements, like holes (see below). However, other insert shapes not able to rotate in the slot may be realized.

According to a further preferred embodiment of the battery pack, a surface of an upper end of the insert includes holes for mounting a plate covering on the mounting side or a surface of a lower end of the insert includes holes for mounting a plate covering the bottom side of the battery pack. That is, the attachment of top and bottom battery covers may be simplified by means of for example self-tapping screws.

According to another aspect of the present invention, a vehicle including the battery pack as defined above is provided. The battery pack is mounted (directly or indirectly) to a carrying structure of the vehicle by means of fixation elements, such as screws, passing the through-holes of the inserts.

Further aspects of the present invention could be learned from the dependent claims or the following description.

DESCRIPTION OF THE DRAWINGS

Features will become apparent to those of ordinary skill in the art by describing in detail exemplary embodiments with reference to the attached drawings in which:

FIG. 1 is a schematic view on a vehicle including a battery pack.

FIG. 2 illustrates a schematically sectional view on a battery pack according to the conventional art including a conventional through-hole screwing connection.

FIG. 3 is an enlarged illustration of the conventional through-hole screwing connection used in the battery pack of FIG. 2.

FIG. 4 illustrates a partly perspective view on a battery pack according to one embodiment of the present invention and including an insert for establishing a fixation to a vehicle part.

FIG. 5 is a view on the insert used the exemplary embodiment of the present invention shown in FIG. 4.

MODE FOR INVENTION

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. As used herein, the term "and/or" includes any and all combinations of one or more of the associated listed items. Further, the use of "may"

when describing embodiments of the present invention refers to "one or more embodiments of the present invention."

Herein, the terms "upper" and "lower" are defined according to the z-axis. For example, the upper cover is positioned at the upper part of the z-axis, whereas the lower cover is positioned at the lower part thereof. In the drawings, the sizes of elements may be exaggerated for clarity. For example, in the drawings, the size or thickness of each element may be arbitrarily shown for illustrative purposes, and thus the embodiments of the present invention should not be construed as being limited thereto.

In electric or hybrid vehicles the battery packs usually demand huge spaces inside the lower vehicle body, i.e. floor. Therefore the battery pack has to provide several fixation measures to ensure fixation to the vehicle carrying structure. FIG. 1 illustrates in a simple way a vehicle 300 including a battery pack 10 mounted at the bottom of a carrying structure of the vehicle 300.

FIG. 2 is a schematically sectional view through a battery pack 10 of the state of art being mounted to a carrying structure of a vehicle, like the one illustrated schematically in FIG. 1, by means of a conventional fixation. The battery pack 10 comprises a number of battery modules 12, each including a plurality of secondary battery cells (here not shown in detail). The battery modules 12 are assembled within a metal framework 14, which includes an overall circumferential frame 16 and several cross members 18 interposed between each of the battery modules 12. The metal framework 14 for supporting the battery modules 12 includes a plurality of through-holes 20 extending from a bottom side to an opposing mounting side of the battery pack 10. The through-holes 20 are adapted for accommodating a screw 22 as a fixation member. The framework 14 may be made of aluminum or an aluminum alloy.

Here, the fixation points of the BIW ("Body In White") or vehicle are located behind the battery pack 10, more specifically, the exemplary battery pack 10 is mounted as an underfloor application to the vehicle floor which complies to the embodiment of FIG. 1. Thus, the mounting direction is from the bottom side towards the mounting side of the battery pack 10. To ensure a rigid connection the screw connections have to incorporate the complete thickness of the battery pack 10 by using the through-holes 20. Furthermore, the tightness of the battery pack 10 shall not be affected by these through-holes 20 in any way over the complete battery service lifetime.

A way to establish a through-hole screwing connection of the conventional battery pack 10 of FIG. 2 is shown in FIG. 3. Here a turned steel part or steel bushing 24 is used which is attached to the battery pack 10 by a counter nut 26. A head of the steel bushing 24 includes twist protection elements 28. The disadvantages of the illustrated solution are as follows: Manufacturing of a steel bushing 24 is complex and consists of the steps of shaping, thread cutting, coating (which is needed due to different materials of the steel bushing and aluminum framework), establishing the twist protection, and establishing sealing on lower side of the steel bushing 24. The assembly of the steel bushing 24 to the battery pack is made by attaching the counter nut 26, which also needs to be sealed accordingly. Hence, for establishing such a conventional screw connection three parts are required, namely a coated steel bushing 24, a counter nut 26 and a screw 22. Accordingly, automatization of the process is complicated.

FIG. 4 shows details of an embodiment according to an exemplary embodiment of the present invention. More specifically, the drawing illustrates a perspective view on a part of a battery pack including an inventive insert 200 for more easily establishing a fixation to a vehicle part, in particular a carrying structure thereof. Basically, the battery pack according to the illustrated embodiment may be the same as shown in FIG. 2 except the presence of conventional through-holes 20 for screw connections. The battery pack may be mounted to the floor of a vehicle as schematically shown in FIG. 1.

The embodiment of FIG. 4 departs form the exemplary conventional shape illustrated in FIG. 2 in that a slot 102 of elliptic base is formed by cutting the framework 100 to secure a space therein. The slot 102 extends from a bottom side of the battery pack to a mounting side of the same. The framework may be made of aluminum or an alloy thereof. Within said slot 102 the insert 200 is tightly fitted, i.e. the insert 200 has a cylindrical shape with an elliptic base which corresponds to the shape of the slot 102.

The framework 100 further includes a hole 110 leading into the slot 102 on its side, and the hole 110 extends perpendicular to a longitudinal direction of the framework upwardly towards the slot 102. After positioning of the insert 200 within the slot 102, welding is performed such that a welding joint 220 is established within the hole 110 so as to establish a jointing between the framework and the insert 200. An additional substance may be established in the welding joint 220.

The insert 200 is illustrated separately in FIG. 5 and includes a centrally located through-hole 202. The through-hole 202 is housing a screw 122 (See FIG. 4) necessary to attach the battery to the carrying structure of the vehicle. The insert 200 may be made of the same material as the framework, in particular extruded aluminum.

On an upper surface 204 of the insert 200 holes 210 may be provided on the mounting side (i.e. the side facing the carrying structure of the vehicle), and they are provided for fixing a plate that can cover the mounting side of the insert 200. Further holes may be also provided on the lower surface of the insert 200 so as to fix another plate covering to the bottom side of the battery pack (not shown).

Although the embodiments of the present invention have been described above, the present invention is not limited thereto, and various modifications can be made within the scope of the claims, the description, and the accompanying drawings, which also belong to the scope of the present invention.

The invention claimed is:

1. A battery pack for a vehicle, comprising:
at least one battery module including a plurality of secondary battery cells;
a metal framework for supporting the at least one battery module, the framework including a plurality of slots extending from a bottom side to an opposing mounting side of the battery pack; and
an insert tightly positioned within each slot, the insert being made of a similar material as the framework and including a through-hole adapted for accommodating a fixation element.

2. The battery pack of claim 1, wherein the framework and the insert are made of aluminum or an aluminum alloy.

3. The battery pack of claim 1, wherein a hole is extending from a side surface of the framework towards the slot and the insert is fixed within the slot by means of a welded joint placed within the hole.

4. The battery pack of claim 1, wherein the insert has a shape, which cannot be rotated, when tightly positioned within the slot.

5. The battery pack of claim 4, the insert is a cylindrical body having an elliptic base.

6. The battery pack of claim 1, wherein a surface of an upper end of the insert includes holes for mounting a plate covering on the mounting side or a surface of a lower end of the insert includes holes for mounting a plate covering the bottom side of the battery pack.

7. A vehicle including a battery pack comprising:
- at least one battery module including a plurality of secondary battery cells;
- a metal framework for supporting the at least one battery module, the framework including a plurality of slots extending form a bottom side to an opposing mounting side of the battery pack; and
- an insert tightly positioned within each slot, the insert being made of a similar material as the framework and including a through-hole arranged for accommodating a fixation element,
- wherein the battery pack is mounted to a carrying structure of the vehicle by means of fixation elements passing the through-holes of the inserts.

\* \* \* \* \*